Patented Sept. 17, 1946

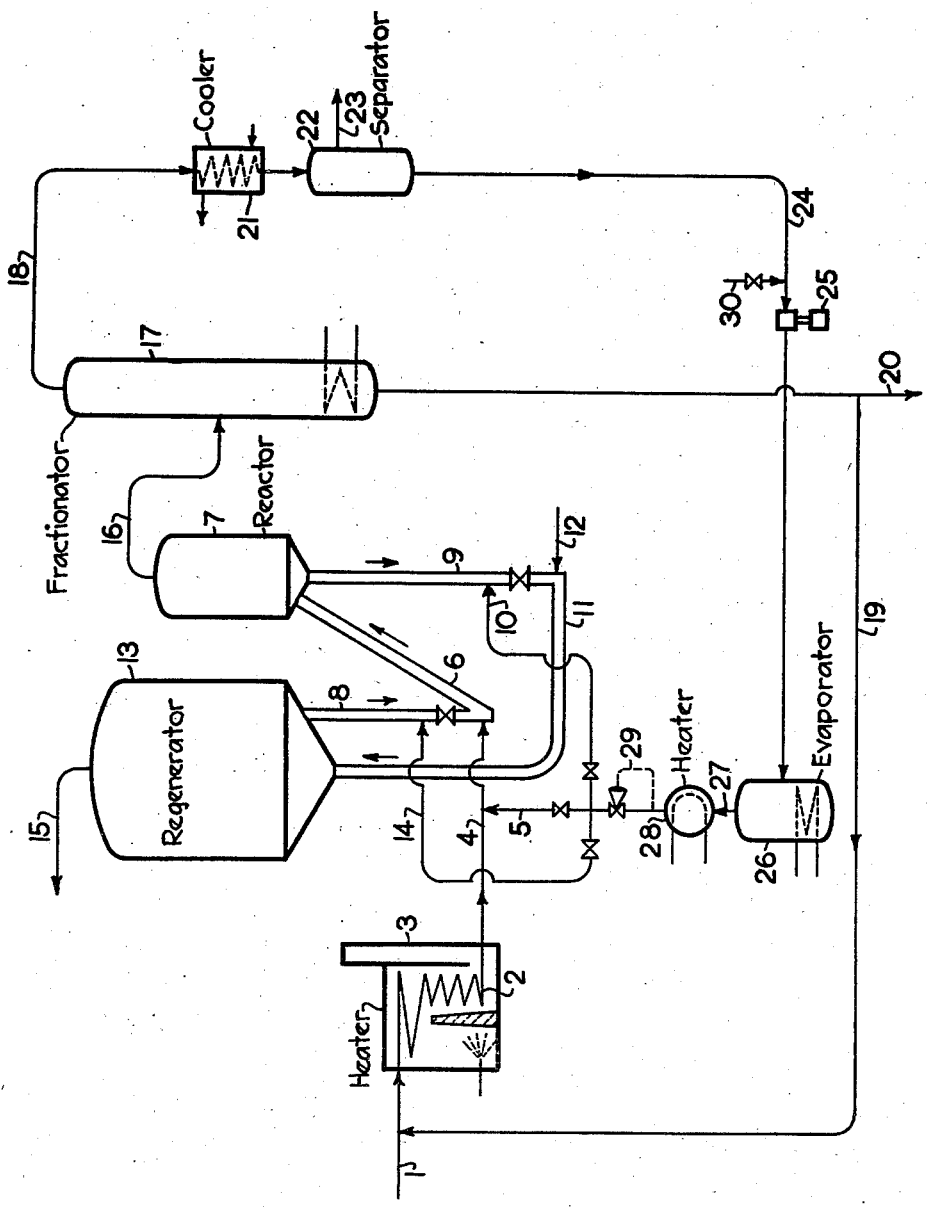

2,407,918

UNITED STATES PATENT OFFICE 2,407,918

CATALYTIC CONVERSION OF CARBONACEOUS MATERIALS

James Burgin, Oakland, Calif., assignor to Shell Development Company, San Francisco, Calif., a corporation of Delaware Application June 1, 1943, Serial No. 489,296

22 Claims. (Cl. 196—50)

This invention relates to the conversion of carbonaceous materials in the vapor phase with specific catalysts. Specific embodiments of the invention relate to the catalytic cracking of hydrocarbon oils, the isomerization of olefins, and the reforming of gasolines.

For effecting various desired conversions of hydrocarbons and other carbonaceous materials a great number of contact agents have been used or suggested. In many of these processes wherein the conversion is effected in the vapor phase it is highly desirable to dilute the reactant vapors with steam. This is, however, often not possible due to the fact that most of the better available catalysts are either poisoned by water vapor or are unstable when used at elevated temperatures in the presence of steam. Thus, for example, for effecting various hydrocarbon treatments such as catalytic cracking, the isomerization of olefins, reforming, isoforming and the like, catalysts of one of two types are employed. In such cases where the desired conversion or treatment involves substantial dehydrogenation, the catalyst generally is a heavy metal oxide such as chromium oxide or molybdenum oxide, usually in combination with a suitable alumina support. Steam cannot, however, generally be used with these catalysts. See, for example, U. S. Patents 2,131,089, 2,167,650 and 2,315,107. In other cases such as catalytic cracking, isoforming, the isomerization of olefins and the like, catalysts of the clay type are generally employed. Such catalysts are comprised of silica and/or alumina, often containing minor amounts of such materials as zirconia, magnesia, magnesium fluoride, etc. They are prepared by a variety of specially developed, very critical and involved processes and are variously termed "hydrated silicates of alumina," "blends of silica and alumina," "silica alumina composites," etc. These catalysts are the best of the hitherto-known catalysts for catalytic cracking. It will be understood, however, that, although the clay type catalysts just described are best known as cracking catalysts, they are capable of accelerating other important reactions. Their superiority as cracking catalysts is largely due to this fact. Thus, in catalytic cracking the cracked products undergo certain catalyzed secondary reactions leading to products which are superior to those obtained by other types of cracking processes. These clay type catalysts, in spite of their excellent qualities, have certain inherent defects. The first of these is that they are severely damaged by contact with steam at elevated conversion temperatures. See, for example, U. S. Patent 2,215,305. A great deal of work has been done in attempts to eliminate this steam-instability by various methods including the addition of materials intended to act as stabilizers, but without success. Another disadvantage of these synthetic clay type catalysts is that they are extremely sensitive to variations in surface characteristics, certain impurities (notably sodium), bulk density, etc. and involve complicated time-consuming and exacting methods of preparation. Consequently, a single charge to a commercial unit involves an investment of several tens of thousands of dollars. Obviously, every precaution is taken to avoid conditions which lead to rapid deactivation of the catalyst.

A sub-class of clay type catalysts which has been suggested for hydrocarbon cracking and related processes but has not been commercially used comprises boric oxide in combination with various suitable supports. These catalysts, while of somewhat different composition from the hitherto-used silica-alumina catalysts, possess the same general types of activities and may therefore be considered as clay type catalysts. They possess excellent activity for the several types of hydrocarbon conversions for which the silica-alumina catalysts are active. One important advantage of the boric oxide catalysts over the silica-alumina catalysts is that they may be more cheaply and uniformly produced from available materials and require a minimum of equipment for their preparation. They are therefore considerably less costly. Another important advantage is that they give low yields of carbon and give gaseous fractions which are exceptionally rich in valuable olefins. This allows such processes to be executed with greater overall yields of valuable products and decreased regeneration costs. Still another advantage of these boric oxide catalysts is that they are devoid of any induction period and have exceptionally high initial activity. They are therefore particularly advantageous for effecting various conversions in the so-called dust catalyst and fluid catalyst systems wherein the hydrocarbon vapors are contacted with the catalyst in a finely divided state. These catalysts nevertheless have the same important defect as the above-described synthetic silica-alumina catalysts; that is, they undergo loss of activity in the presence of steam at elevated temperatures.

It has now been found that these boric oxide catalysts may be made to retain their excellent activity for long periods of use with steam at high temperatures if certain amounts of boric acid are introduced with the steam. Thus, by employing catalysts containing certain prescribed concentrations of boric oxide and using steam containing certain amounts of boric acid, it is possible to effect these various conversions of carbonaceous materials at elevated temperatures with any desired dilution with steam over long periods of time with substantially no loss of catalytic activity and while realizing several important advantages.

The method of operation according to the invention is generally applicable to processes wherein the boric oxide-containing catalysts hereinafter described are employed for the treatment of carbonaceous materials at elevated temperatures and are contacted with steam at elevated temperatures. It is most advantageous, for example, in the treatment or conversion of hydrocarbons and hydrocarbon mixtures such, for instance, as the catalytic cracking of hydrocarbons to produce lower boiling liquid and gaseous hydrocarbons, the isomerization of olefins, the isoforming of cracked gasolines and fractions thereof, the reforming of straight run gasolines, the operation in cracking procedure known as "repassing," gas reversion, and the like. It is also advantageous in many non-hydrocarbon treatments such, for instance, as the dehydration of alcohols and the conversions of isophorone to xylenol.

The method of operation of the invention is found to be advantageous when the catalyst employed contains boric oxide as an active constituent in an effective amount. Operation with other types of catalysts is not appreciably affected by the present method. Applicable catalysts comprise boric oxide in combination with a major amount of other components which may or may not act catalytically. Thus, for example, applicable catalysts comprise an effective amount of boric oxide impregnated into, supported upon and/or homogeneously incorporated into various base materials preferably having a relatively large inner surface. One suitable catalyst is, for example, the so-called "boron silicate" described in U. S. Patent 2,230,464. Another is the so-called "boron aluminum silicates" described in U. S. Patent 2,206,021. Still other suitable catalysts are, for example, the boron-containing catalysts described in U. S. Patents 2,215,305, 2,206,055 and 2,213,345. In certain of the applicable catalysts the boric oxide may form solid solutions or possibly loose compounds. Since, however, the boric oxide is originally incorporated as such and very little is known regarding the actual state of the boric oxide in the catalysts, the catalysts are herein considered as if comprising the boric oxide in the free state.

Particularly suitable catalysts which may be most advantageously employed using the present method of operation consist essentially of boric oxide and an adsorptive alumina. Suitable aluminas comprise, for example, partially dehydrated aluminum hydroxide prepared by precipitation from acid aluminum salt solutions, alumina gels, peptized alumina gels, selected activated bauxites, and the like.

A preferred type of boric oxide-alumina catalysts, however, is that prepared by impregnating an adsorptive alumina obtained by partial dehydration of an alumina trihydrate precipitated from an alkali aluminate solution. In order to produce this preferred type of boric oxide-alumina catalyst having the desired superior properties, it is essential that the alumina employed have certain properties. As is known, there is a large variety of available aluminas prepared by different methods which differ considerably in their physical and catalytic properties. The properties of the alumina which come into consideration, although the reasons are not fully understood, appear to be the physical form, the surface charge, the content of impurities, the density, the degree of hydration, the surface area, and the crystal lattice. These properties are determined by the methods of formation and treatment of the alumina. The desired form of alumina is crystalline and shows a distinct pattern of böhmite upon examination by electron diffraction. Suitable crystalline base alumina is obtained by certain slow precipitation methods in a fine, granular or massive physical form. Regarding the surface charge, it is found that the alumina preferably has a negatively charged surface. Such a surface is indicated by an ability to selectively adsorb cations rather than anions. Thus, for instance, the preferred alumina readily adsorbs cationic dye-stuffs such as methylene blue but does not readily adsorb anionic dye-stuffs such as eosine A. Regarding the purity of the alumina, it may be stated that small amounts of the usual impurities do not appear to be detrimental but, as pointed out below, may even be desirable. Regarding the degree of hydration, it may be stated that the preferred alumina contains between about 4% and 12% water as determined by loss on ignition. Alumina essentially in the gamma form, i. e. having less than 4% water, is somewhat inferior but may also be advantageously used. Regarding the density, it is found that the preferred alumina has a bulk density between about 0.8 and 1.2. The surface area (as measured by adsorption of nitrogen) is preferably quite large but not generally above about 250 square meters per gram. Various suitable aluminas have been found to have surface areas between about 80 and 200 square meters per gram. The crystal lattice of the alumina is also important. The preferred aluminas belong to the gamma system. These various properties of the aluminas may be varied by change in the method of preparation. A suitable method of preparation which generally leads to alumina having the above-described characteristics is by the slow crystallization of alpha alumina trihydrate and/or beta alumina trihydrate from alkali aluminate solutions followed by partial dehydration of the trihydrate to a water content between about 4% and 12%. The aluminas so prepared, unless acid-washed, contain appreciable concentrations of alkali, for instance, sodium. Thus, the alumina may contain, for instance, from 0.5% to 2% sodium. This is in sharp contrast to the conventional clay type catalyst described above in which sodium is extremely detrimental and is removed as completely as possible. These superior and preferred boric oxide alumina catalysts are more fully described and claimed in copending application Serial No. 478,438, filed March 8, 1943, and of which the present application is a continuation-in-part.

The boric oxide may be combined with the alumina or other suitable relatively inert component in any one of a number of ways. In such cases, for instance where the alumina or other component is in the form of fragments, pellets or powder having a large internal surface, the boric oxide may be conveniently incorporated by impregnation. A suitable method is to soak the particles, pellets or powder in a solution of boric oxide or a compound of boron which may be easily converted to boric oxide, for instance, by heating. Suitable boron compounds are, for example, boric acid, ammonium borate, fluoroboric acid, various organic compounds of boron such as the boric acid esters and alkyl boranes, etc. After impregnation the impregnated boron compound is converted to boric oxide, for instance, by drying and then calcining at a temperature above about 300° C. In many cases two or more such impregnations and calcinations are required to impregnate the carrier component with the desired amount of boric oxide. The final calcination may, if desired, be effected in the reaction zone under the reaction conditions.

In such cases where the alumina or other relatively inert component is in the form of a gel, peptized gel or the like, it may be homogenized with boric acid or other suitable compound of boron which may be easily converted to the boric oxide and the homogenized mixture calcined to simultaneously effect a partial dehydration of the gel and convert the applied compound of boron to boric oxide.

The boric oxide in these applicable catalysts is a major active constituent and must therefore be present in an effective amount. The optimum concentration of boric oxide appears to be that sufficient to form a mono-molecular layer of boric oxide on the available surface of the alumina or other relatively inert support (as measured by adsorption of nitrogen in the usual manner). The concentration of boric oxide may vary from the optimum to a considerable extent, however, while still affording practical catalysts. Thus, concentrations ranging between about $1.5 \times 10^{-4}$ g./m.$^2$ to about $9.5 \times 10^{-4}$ g./m.$^2$ may be employed. A preferred range is between about $5 \times 10^{-4}$ g./m.$^2$ and $8.6 \times 10^{-4}$ g./m.$^2$. In terms of weight per cent boric oxide, the minimum effective amount is above 2.5% and very suitable concentrations are, for instance, between about 10% and 20%.

These catalysts, it is found, retain their initial activity, or substantially their initial activity (for instance, 85% of their initial activity), over long periods of time in the presence of steam when the steam contains suitable concentrations of boric acid. The boric acid probably exists in the steam largely in the form of meta boric acid ($H_3BO_3 \rightleftharpoons HBO_2 + H_2O$). However, for convenience in expressing concentrations, the boric acid is herein considered as being ortho boric acid ($H_3BO_3$). The concentration of boric acid required for most efficient stabilization, it is found, depends upon the amount of steam applied and upon the concentration of boric oxide in the catalyst. It is surprising, however, that it is relatively independent of the temperature. In general, only small amounts in the order of 0.3% to 5% of the steam are sufficient. It is to be particularly noted that the boric acid added with the steam is not a catalyst per se, and its addition to the steam exerts no noticeable effect upon the conversions or catalytic action except through stabilization of the activity of the catalyst. Once the catalyst is spent, i. e. deactivated, the introduction of the prescribed boric acid with the steam does not effect a reactivation.

The boric acid may be added to the steam in any one of a number of ways. One suitable method is, for example, to vaporize a solution of boric acid of such concentration and under such conditions of temperature and pressure that the steam contains the desired concentration of boric acid. The steam-boric acid mixture may, if desired, then be superheated and expanded prior to introducing it into the reaction zone. Another suitable method is to pass the steam (or the total feed including vapors of the carbonaceous reactant and steam) under suitable conditions of temperature and pressure through a mass of boric acid. Another suitable method is to flash evaporate a solution of boric acid of suitable concentration.

The boric acid or its equivalent supplied with the steam need not be wasted but may be reused indefinitely. Thus, for example, the product may be condensed, in which case the boric acid applied is found in the condensed water phase and this boric acid solution may be vaporized and reused.

The method of the invention may be applied when the process or conversion is carried out in any of the known fixed bed, moving bed or dust catalyst systems. In fixed bed systems, the catalyst, usually in the form of pellets or fragments of suitable size, is supported in a fixed bed in a suitable converter or catalyst case and the carbonaceous material to be treated is passed in contact therewith under conditions conducive to the desired conversion. In moving bed systems, means are provided for continuously or intermittently removing partially spent catalyst from the reaction zone and continuously or intermittently adding an equivalent amount of freshly regenerated catalyst to the reaction zone.

As pointed out above, the catalysts of the invention are particularly suited for use in effecting various conversions in the so-called fluid catalyst and dust catalyst systems of operation. There are a number of dust catalyst systems of operation, any of which may be employed. Thus, for example, the systems described in World Petroleum, 12th Annual Refinery Issue, pages 52–55, may be used. In the so-called fluid catalyst systems of operation, of which there are several applicable variations, the catalyst is in a finely divided fluidized state and is continuously transported by gravity or gaseous media through a reaction zone and regeneration zones, and usually one or more catastats or flushing zones. One suitable fluid catalyst system is illustrated diagrammatically by conventional figures not drawn to scale in the attached drawing. This particular system is applicable to various operations such, for instance, as catalytic cracking, isomerization of olefins, reforming, isoforming, repassing, and the like. For convenience, it will be described in connection with a catalytic cracking operation. Referring to the drawing, the hydrocarbon feed, for instance a gas oil fraction entering via line 1, is vaporized and preheated to approximately the reaction temperature in coil 2 in a suitable heating furnace 3. The preheated vapors in line 4 are mixed with the required amount of steam and boric acid vapors entering by line 5 and the mixture passes via line 6 to the reactor 7 wherein it is contacted with the finely divided catalyst in a fluidized state. The amount of steam employed depends upon the particular hydrocarbon feed and the type of product desired. Typical quantities are, for example, between about 5% and 25% by volume of water based on the hydrocarbon. The optimum concentration of boric acid in the steam depends upon the amount of steam, upon the concentration of boric oxide in the catalyst, and to a certain extent upon the temperature in the reaction zone. When employing about 10% by weight water based on the hydrocarbon and employing a catalyst containing about 11%–12% $B_2O_3$ under cracking conditions, for example, typical concentrations of boric acid are between about 0.3% and 1.1% by weight of the steam.

The vaporous mixture of hydrocarbon, steam and boric acid in line 4 going to the reaction zone is mixed with a suitable quantity of active catalyst from line 8. The amount of catalyst supplied with the feed depends upon the activity of the catalyst, the susceptibility of the hydrocarbon to cracking, the temperature in the reaction zone, and may vary considerably. Typical weight ratios of catalyst to hydrocarbon are, for example, between about 5:1 and 20:1.

The conditions in the cracking chamber 7 may vary and will depend upon the particular operation. Typical conditions for average operations are, for example:

| | |
|---|---|
| Temperature | 450° C.–570° C. |
| Pressure | 1–3 atmospheres |
| Contact time | 3–20 seconds |

Partially spent catalyst is withdrawn from the reaction chamber via line 9. In order to strip the withdrawn catalyst of the larger part of the more volatile hydrocarbons and/or in order to maintain the catalyst in line 9 in a fluidized condition, a small amount of stripping gas is introduced into line 9 via line 10. According to a preferred embodiment of the invention, the stripping gas used is a mixture of steam and boric acid such as introduced via line 5 with the hydrocarbon feed.

The partially spent catalyst is carried in line 11 by a stream of regeneration gas, such as air or a mixture of flue gas and air entering via line 12, to a regenerator 13 wherein carbonaceous deposits on the catalyst are burnt off. The regenerated catalyst is withdrawn from the regenerator 13 via line 8. In order to flush the regenerated catalyst of free oxygen and/or to maintain the catalyst in line 8 in a fluidized state, a flushing or stripping gas is introduced via line 14. According to a preferred embodiment of the invention, this flushing gas is a mixture of steam and boric acid such as introduced via line 5 with the hydrocarbon feed. The spent regeneration gases leave the regenerator via line 15.

The products from the reactor 7 pass via line 16 to a fractionator 17. The conditions in fractionator 17 are adjusted such that the cracked products, steam and boric acid pass overhead leaving a bottom fraction consisting predominantly of heavier hydrocarbons and any catalyst fines carried over from the reactor. In order to remove the boric acid overhead a still-head temperature above about 120° C.–132° C. is generally required. The heavier bottom product may be recycled in whole or in part via line 19 or may be withdrawn from the system via line 20. The overhead product passes via line 18 through a cooler 21 and then to a separator 22 wherein the hydrocarbon is separated from a lower aqueous phase consisting of the condensed steam and the boric acid. The hydrocarbon product is withdrawn via line 23. The lower aqueous solution of boric acid is withdrawn via line 24 and pump 25 to an evaporator or boiler 26. The conditions in boiler 26 are adjusted, preferably by adjusting the pressure, such that the vapors leaving by line 27 contain about the same concentration of boric acid as the aqueous solution entering by line 24. This may require a pressure of, for example, 2–10 atmospheres, depending upon the concentration of boric acid in the aqueous feed. The vapors from the evaporator or boiler 26 are preferably preheated in a preheater 28 and then reduced to substantially the reaction pressure by a reduction valve 29. The preheated vapors at substantially (slightly above) the reaction pressure then pass via line 5 to the feed and/or via line 14 and/or 10 to flush and strip the catalyst in lines 11 and/or 9. Additional water and boric acid may be added to the system via line 30 to make up for losses, etc.

The invention embraces the use of a mixture of steam and boric acid in any case where a boric oxide catalyst of the type described is contacted with steam at an elevated temperature. Thus, in some cases it may not be desired to add any steam to the reaction mixture going to the reaction zone. In such cases the method of the invention may nevertheless be advantageously employed using the mixture of steam and boric acid in the flushing steps. This is because steam under pressure is particularly damaging to most catalysts, and it is in these flushing steps where the maximum steam pressures are usually encountered. If considerable quantities of steam are used for flushing the regenerated catalyst, it may be desirable to condense the steam and boric acid from the spent regeneration gases and return the aqueous boric acid solution so formed (after filtering, if necessary) to the evaporator. In such cases where the amount of steam applied for flushing the regenerated catalyst is quite small, however, it is usually more economical to simply vent the spent regeneration gas as is done in the modification illustrated in the drawing.

Various aspects of the invention are illustrated in the following non-limiting examples:

Example I

The loss of catalytic activity of clay type catalysts with steaming is manifested by a considerable drop in the available catalytic surface. Aluminas when steamed for 8 hours at 566° C., for example, were found to change in specific surface as follows:

| | Specific surface, m²/g. | |
|---|---|---|
| | Before steaming | After steaming |
| Alumina gel | 228 | 150 |
| Peptized alumina gel | 191 | 156 |
| Alorco grade-A Activated Alumina | 190 | 95 |

Example II

The loss of cracking activity of typical boria-alumina catalysts on steaming for various lengths of time at 566° C. is shown in the following:

(1) A peptized alumina gel+15% $B_2O_3$ on steaming for 100 hours lost about 54% of its activity.

(2) An Activated Alumina impregnated with 12% $B_2O_3$ on steaming for 100 hours lost about 66% of its activity.

(3) Another Activated Alumina impregnated with 12% $B_2O_3$ on steaming lost the following percentages of its activity:

| Steaming, hrs. | Loss of activity |
|---|---|
| | Per cent |
| 8 | 10 |
| 32 | 46 |
| 80 | 73 |

Example III

A commercial silica-alumina cracking catalyst was steamed for 8 hours at 566° C. at a rate of 10 cc. of water per minute per liter of catalyst. After this treatment the catalyst was found to have lost about 25% of its activity. The same commercial catalyst, when steamed for 24 hours at 566° C. at a rate of 10 cc. of water per minute per liter of catalyst, lost about 31% of its activity. Longer treatment with steam effects a correspondingly greater decrease in the activity. The impregnation of the steam-deactivated catalyst with boric oxide did not produce any noticeable change in the activity.

The above examples show the typical steam-instability of synthetic cracking catalysts.

Example IV

A boric oxide-alumina catalyst was prepared as follows: A quantity of granules of an adsorptive alumina was boiled under reflux with 2 volumes of a 25.9% aqueous solution of boric acid for 18 hours. The aqueous boric acid solution was removed and the impregnated alumina was then dried at 110° C. and finally calcined at 500° C. for 6 hours. The resulting catalyst contained about 12.6% $B_2O_3$. This catalyst was treated for 8 hours at 565° C. with a mixture of steam and boric acid, the amount of steam being equivalent to 10 cc. of water per minute per liter of catalyst. The activity of the catalyst after such treatment (as measured in catalytic cracking) was about 91% of the initial activity.

Example V

A catalyst prepared as described above in Example IV was treated for 8 hours at 565° C. with a mixture of steam and boric acid produced by flash evaporating a boric acid solution containing the equivalent of 1% $B_2O_3$, the rate of steam introduction being equivalent to 10 cc. of water per minute per liter of catalyst. After this treatment the activity of the catalyst (as measured in catalytic cracking) was about 93% of the initial activity.

Example VI

A boric oxide-alumina catalyst, prepared by impregnating granules of an adsorptive alumina with boric acid in two steps followed by heating to convert the boric acid to boric oxide, was used for cracking gas oil, using a 1:1 mol ratio of steam to gas oil. During a short period of such use, the activity of the catalyst dropped to about 90% of the initial activity. In subsequent runs using the same catalyst, about 0.1% boric acid, based on the total feed, was added to the steam. When operating in this manner no appreciable decline in the activity of the catalyst was noted.

I claim as my invention:

1. In a process for effecting a catalytic conversion of a carbonaceous material at an elevated temperature with a catalyst consisting essentially of a minor effective amount of boric oxide and a major amount of a relatively inert catalyst carrier wherein the carbonaceous material to be converted is passed in a fluid state in contact with the catalyst in a suitable reaction zone, the improvement which comprises forming a mixture of steam and boric acid, and passing said mixture through the reaction zone with the fluid carbonaceous reactant to be converted.

2. In a process for effecting a catalytic conversion of a carbonaceous material at an elevated temperature with a catalyst consisting essentially of a minor effective amount of boric oxide and a major amount of alumina wherein the carbonaceous material to be converted is passed in a fluid state in contact with the catalyst in a suitable reaction zone, the improvement which comprises forming a mixture of steam and boric acid, and passing said mixture through the reaction zone with the fluid carbonaceous reactant to be converted.

3. In a process for effecting a catalytic conversion of a carbonaceous material at an elevated temperature with a catalyst consisting essentially of an adsorptive support impregnated with a minor effective amount of boric oxide wherein the carbonaceous material to be converted is passed in a fluid state in contact with the catalyst in a suitable reaction zone, the improvement which comprises forming a mixture of steam and boric acid, and passing said mixture through the reaction zone with the fluid carbonaceous reactant to be converted.

4. In a process for effecting a catalytic conversion of a carbonaceous material at an elevated temperature with a catalyst consisting essentially of about 10%–20% boric oxide and 80%–90% aluminum wherein the carbonaceous material to be converted is passed in a fluid state in contact with the catalyst in a suitable reaction zone, the improvement which comprises forming a mixture of steam and boric acid, and passing said mixture through the reaction zone with the fluid carbonaceous reactant to be converted.

5. In a process for effecting a catalytic conversion of a carbonaceous material at an elevated temperature with a catalyst consisting essentially of an adsorptive alumina obtained by the partial dehydration of an alumina trihydrate crystallized from an alkaline aluminate solution, said adsorptive alumina having incorporated on the available surface between about $1.5 \times 10^{-4}$ and $9.5 \times 10^{-4}$ grams of boric oxide per square meter, wherein the carbonaceous material to be converted is passed in a fluid state in contact with the catalyst in a suitable reaction zone, the improvement which comprises forming a mixture of steam and boric acid, and passing said mixture through the reaction zone with the fluid carbonaceous reactant to be converted.

6. In a process for effecting a catalytic conversion of a carbonaceous material at an elevated temperature with a catalyst consisting essentially of a minor effective amount of boric oxide and a major amount of a relatively inert catalyst carrier wherein the carbonaceous material to be converted is passed in a fluid state in contact with the catalyst in a suitable reaction zone, the improvement which comprises forming a mixture of steam and boric acid, said mixture containing between about 0.3% and 5% boric acid, and passing said mixture through the reaction zone with the fluid carbonaceous reactant to be converted.

7. In a process for effecting a catalytic conversion of a hydrocarbon at an elevated temperature with a catalyst consisting essentially of a minor effective amount of boric oxide and a major amount of a relatively inert catalyst carrier wherein the hydrocarbon to be converted is passed in a fluid state in contact with the catalyst in a suitable reaction zone, the improvement which comprises forming a mixture of steam and boric acid, and passing said mixture through the reaction zone with the fluid hydrocarbon reactant to be converted.

8. In a process for effecting the catalytic cracking of a hydrocarbon oil at cracking temperatures with a catalyst consisting essentially of a minor effective amount of boric oxide and a major amount of a relatively inert catalyst carrier wherein the hydrocarbon oil to be cracked is passed in a fluid state in contact with the catalyst in a suitable reaction zone, the improvement which comprises forming a mixture of steam and boric acid, and passing said mixture through the reaction zone with the fluid hydrocarbon oil to be cracked.

9. In a process for effecting the catalytic isomerization of an isomerizable olefin with a catalyst consisting essentially of a minor effective amount of boric oxide and a major amount of a relatively inert catalyst carrier wherein the olefin to be isomerized is passed in a fluid state in contact with the catalyst in a suitable reaction zone, the improvement which comprises forming a mixture of steam and boric acid, and passing said mixture through the reaction zone with the fluid olefin to be isomerized.

10. In a process for isoforming a cracked gasoline at incipient cracking temperatures with a catalyst consisting essentially of a minor effective amount of boric oxide and a major amount of a relatively inert catalyst carrier wherein the cracked gasoline to be isoformed is passed in a fluid state in contact with the catalyst in a suitable reaction zone, the improvement which comprises forming a mixture of steam and boric acid, and passing said mixture through the reaction zone with the fluid cracked gasoline to be isoformed.

11. In a process for effecting a catalytic conversion of a carbonaceous material at an elevated temperature with a catalyst consisting essentially of a minor effective amount of boric oxide and a major amount of a relatively inert catalyst carrier wherein the catalyst in a finely divided state is recycled through a suitable reaction zone and through a suitable regeneration zone, the improvement which comprises subjecting the catalyst after withdrawal from one of said zones and prior to introduction into the other of said zones to the action of mixed vapors of boric acid and steam.

12. In a process for effecting a catalytic conversion of a carbonaceous material at an elevated temperature with a catalyst consisting essentially of a minor effective amount of boric oxide and a major amount of a relatively inert catalyst carrier wherein the catalyst in a finely divided state is recycled through a suitable reaction zone and through a suitable regeneration zone, the improvement which comprises subjecting the catalyst after withdrawal from the reaction zone and prior to introduction into the regeneration zone to the action of mixed vapors of boric acid and steam.

13. In a process for effecting a catalytic conversion of a carbonaceous material at an elevated temperature with a catalyst consisting essentially of a minor effective amount of boric oxide and a major amount of a relatively inert catalyst carrier wherein the catalyst in a finely divided state is recycled through a suitable reaction zone and through a suitable regeneration zone, the improvement which comprises subjecting the catalyst after withdrawal from the regeneration zone and prior to introduction into the reaction zone to the action of mixed vapors of boric acid and steam.

14. In a process for effecting a catalytic conversion of a carbonaceous material at an elevated temperature with a catalyst consisting essentially of about 10%–20% boric oxide and 80%–90% alumina wherein the catalyst in a finely divided state is recycled through a suitable reaction zone and through a suitable regeneration zone, the improvement which comprises subjecting the catalyst after withdrawal from one of said zones and prior to introduction into the other of said zones to the action of mixed vapors of boric acid and steam.

15. In a process for effecting a catalytic conversion of a carbonaceous material at an elevated temperature with a catalyst consisting essentially of an adsorptive alumina obtained by the partial dehydration of an alumina trihydrate crystallized from an alkaline aluminate solution, said adsorptive alumina having incorporated on the available surface between about $1.5 \times 10^{-4}$ and $9.5 \times 10^{-4}$ grams of boric oxide per square meter, wherein the catalyst in a finely divided state is recycled through a suitable reaction zone and through a suitable regeneration zone, the improvement which comprises subjecting the catalyst after withdrawl from one of said zones and prior to introduction into the other of said zones to the action of mixed vapors of boric acid and steam.

16. In a process for effecting a catalytic conversion of a carbonaceous material at an elevated temperature with a catalyst consisting essentially of a minor effective amount of boric oxide and a major amount of a relatively inert catalyst carrier wherein the catalyst in a finely divided state is recycled through a suitable reaction zone and through a suitable regeneration zone, the improvement which comprises subjecting the catalyst after withdrawl from one of said zones and prior to introduction into the other of said zones to the action of mixed vapors of boric acid and steam, said mixture containing between about 0.3% and 5% boric acid.

17. In a process for effecting a catalytic conversion of a carbonaceous material with a catalyst consisting essentially of a minor effective amount of boric oxide and a major amount of a relatively inert catalyst carrier wherein the catalyst is contacted at an elevated temperature with steam, the improvement which comprises adding to the steam prior to contact with the catalyst between about 0.3% and 5% of boric acid.

18. In a process for effecting the catalytic cracking of a hydrocarbon oil with a catalyst consisting essentially of a minor effective amount of boric oxide and a major amount of alumina wherein vapors of the hydrocarbon oil to be cracked are contacted with said catalyst under cracking conditions in a cracking zone, the improvement which comprises forming a mixture of steam and boric acid as hereinafter specified, passing said mixture of steam and boric acid into the reaction zone in contact with the hydrocarbon vapors and the catalyst, subjecting the mixture of steam, boric acid and hydrocarbons from said reaction zone to a fractionation to separate a lower boiling fraction comprising substantially all of the steam and boric acid and the lower boiling cracked products, cooling said lower boiling fraction to condense the steam, allowing said cooled fraction to stratify into a hydrocarbon layer and an aqueous solution of boric acid, forcing said aqueous solution into an evaporator, evaporating said solution under such a pressure that the aqueous vapors contain substantially the same concentration of boric acid as said aqueous solution fed to the evaporator, superheating said aqueous vapors, reducing the pressure of said superheated vapors to substantially the pressure of said cracking zone, and feeding said superheated and expanded vapors of steam and boric acid to the reaction zone as specified above.

19. In a process for the conversion of hydrocarbons wherein a catalyst containing boron oxide is utilized and wherein said catalyst is contacted with steam, the improvement which comprises substantially saturating said steam with boric acid before it contacts said catalyst.

20. In a process for the conversion of hydrocarbon oils wherein a catalyst comprising boron oxide and alumina is utilized and wherein said catalyst is contacted with steam, the improvement which comprises incorporating boric acid with said steam before the latter contacts said catalyst.

21. In a process for the conversion of hydrocarbons wherein a catalyst containing boron oxide is utilized and wherein said catalyst is contacted with steam, the improvement which comprises incorporating boric acid with said steam before it contacts said catalyst.

22. In a process for effecting a catalytic conversion of carbonaceous material at an elevated temperature with a catalyst containing boric oxide wherein the catalyst in a finely divided state is removed from the reaction zone and transferred to a regeneration zone, the improvement which comprises subjecting the catalyst after removal from the reaction zone and prior to introduction into the regeneration zone to the action of steam containing boric acid.

JAMES BURGIN.